(12) United States Patent
Tsubaki

(10) Patent No.: US 10,173,717 B2
(45) Date of Patent: Jan. 8, 2019

(54) ELECTRIC POWER STEERING APPARATUS

(71) Applicant: NSK Ltd., Tokyo (JP)

(72) Inventor: Takahiro Tsubaki, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/559,118

(22) PCT Filed: Aug. 10, 2016

(86) PCT No.: PCT/JP2016/073563
§ 371 (c)(1),
(2) Date: Sep. 18, 2017

(87) PCT Pub. No.: WO2017/030067
PCT Pub. Date: Feb. 23, 2017

(65) Prior Publication Data
US 2018/0244307 A1   Aug. 30, 2018

(30) Foreign Application Priority Data

Aug. 19, 2015 (JP) .................. 2015-161698
Feb. 29, 2016 (JP) .................. 2016-037404

(51) Int. Cl.
B62D 5/04   (2006.01)

(52) U.S. Cl.
CPC ......... B62D 5/0472 (2013.01); B62D 5/0463 (2013.01)

(58) Field of Classification Search
CPC ........ B62D 5/0409; B62D 6/00; B62D 6/008; B62D 6/02; B62D 6/04; B62D 6/06;
(Continued)

(56) References Cited

U.S. PATENT DOCUMENTS 9,452,774 B2 *   9/2016  Jang .................. B62D 5/0409
2001/0041957 A1  11/2001  McCann et al.
(Continued)

FOREIGN PATENT DOCUMENTS

EP   0943527 A2   9/1999
EP   1990257 A1   11/2008
(Continued)

OTHER PUBLICATIONS

International Search Report of PCT/JP2016/073563 dated Nov. 1, 2016.
(Continued)

Primary Examiner — Thomas G Black
Assistant Examiner — Ce Li Li
(74) Attorney, Agent, or Firm — Sughrue Mion, PLLC

(57) ABSTRACT

[Problem]
An object of the present invention is to provide an electric power steering apparatus that can accurately suppress a vibration, a noisy sound and so on whose vibration source is a power spectrum occurring from a relationship between an operation period of torque control and an operation period of current control, and which occur regardless of presence or absence of a mechanical resonance.
[Means for solving the problem]
In an electric power steering apparatus that comprises a torque control section which calculates a current command value based on at least a steering torque and a current control section which controls a motor current flowing to a motor based on the current command value, an operation period of the torque control section is longer than or equal to an operation period of the current control section, and the current control section comprises a specific frequency band eliminating section that attenuates at least one frequency component having a frequency obtained by multiplying
(Continued)

about half of an operation frequency of the torque control section by a natural number in the current command value.

11 Claims, 10 Drawing Sheets

(58) Field of Classification Search
CPC ......... B62D 6/08; B62D 6/10; H02P 21/0003; H02P 21/05; H02P 21/22; H02P 23/04; H02P 27/08
See application file for complete search history.

(56) References Cited

U.S. PATENT DOCUMENTS

| | | | |
|---|---|---|---|
| 2006/0271232 A1 | 11/2006 | Toyama et al. | |
| 2009/0192679 A1* | 7/2009 | Kobayashi | B62D 5/0463 701/42 |
| 2015/0298726 A1* | 10/2015 | Aoki | B62D 5/0463 701/43 |
| 2015/0321691 A1* | 11/2015 | Jang | B62D 5/0463 180/446 |
| 2017/0166244 A1* | 6/2017 | Ko | B62D 5/0472 |
| 2018/0201306 A1* | 7/2018 | Tsubaki | B62D 5/0409 |

FOREIGN PATENT DOCUMENTS

| | | |
|---|---|---|
| JP | 11-286280 A | 10/1999 |
| JP | 2003-534180 A | 11/2003 |
| JP | 2004-352001 A | 12/2004 |
| JP | 2006-340446 A | 12/2006 |
| JP | 5235536 B2 | 7/2013 |
| JP | 5456576 B2 | 4/2014 |
| JP | 2014-141173 A | 8/2014 |

OTHER PUBLICATIONS

International Preliminary Report on Patentability of PCT/JP2016/073563 dated May 30, 2017.

* cited by examiner

PRIOR ART

PRIOR ART

PRIOR ART

ELECTRIC POWER STEERING APPARATUS

CROSS REFERENCE TO RELATED APPLICATIONS

This application is a National Stage of International Application No. PCT/JP2016/073563 filed Aug. 10, 2016, claiming priority based on Japanese Patent Application No. 2015-161698 filed Aug. 19, 2015 and Japanese Patent Application No. 2016-037404 filed Feb. 29, 2016, the contents of all of which are incorporated herein by reference in their entirety.

TECHNICAL FIELD

The present invention relates to an electric power steering apparatus that comprises a torque control section which calculates a current command value based on at least a steering torque and a current control section which controls a motor current flowing to a motor based on the current command value, and in particular to an electric power steering apparatus having a function of attenuating a specific frequency component.

BACKGROUND ART

An electric power steering apparatus (EPS) which assists and control a steering system of a vehicle by means of a rotational torque of a motor, applies a driving force of the motor as a steering assist torque (an assist torque) to a steering shaft or a rack shaft by means of a transmission mechanism such as gears or a belt through a reduction mechanism. In order to accurately generate the steering assist torque, such a conventional electric power steering apparatus performs feedback control of a motor current. The feedback control adjusts a voltage supplied to the motor so that a difference between a current command value and a detected motor current value becomes small, and the adjustment of the voltage supplied to the motor is generally performed by an adjustment of a duty ratio of pulse width modulation (PWM) control.

A general configuration of the electric power steering apparatus will be described with reference to FIG. 1. As shown in FIG. 1, a column shaft (a steering shaft or a handle shaft) 2 connected to a steering wheel 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque of the steering wheel 1 and a steering angle sensor 14 for detecting a steering angle θ, and a motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key (IG) signal is inputted into the control unit 30 through an ignition key 11. The control unit 30 calculates a current command value of an assist (steering assist) command on the basis of a steering torque Ts detected by the torque sensor 10 and a vehicle speed Vs detected by a vehicle speed sensor 12, and controls a current supplied to the motor 20 for the EPS by means of a voltage control command value Vref obtained by performing compensation or the like to the current command value.

Moreover, the steering angle sensor 14 is not essential, it does not need to be provided, and it is possible to obtain the steering angle from a rotation sensor such as a resolver connected to the motor 20.

A controller area network (CAN) 100 exchanging various information of a vehicle is connected to the control unit 30, and it is possible to receive the vehicle speed Vs from the CAN 100. Further, it is also possible to connect a non-CAN 101 exchanging a communication, analog/digital signals, a radio wave or the like except with the CAN 100 to the control unit 30.

The control unit 30 mainly comprises an MCU (including a CPU, an MPU and so on), and general functions performed by programs within the MCU are shown in FIG. 2.

Functions and operations of the control unit 30 will be described with reference to FIG. 2. As shown in FIG. 2, the steering torque Ts detected by the torque sensor 10 and the vehicle speed Vs detected by the vehicle speed sensor 12 (or from the CAN 100) are inputted into a current command value calculating section 31 that calculates a current command value 'ref'. The current command value calculating section 31 calculates the current command value Iref1 that is a control target value of a motor current supplied to the motor 20 on the basis of the inputted steering torque Ts and the inputted vehicle speed Vs and by using an assist map or the like. The current command value 'ref' is inputted into a current limiting section 33 through an adding section 32A. A current command value Irefm the maximum current of which is limited is inputted into a subtracting section 32B, and a deviation I (=Irefm−Im) between the current command value Irefm and a motor current value Im being fed back is calculated. The deviation I is inputted into a proportional-integral (PI) control section 35 for improving a characteristic of the steering operation. The voltage control command value Vref whose characteristic is improved by the PI-control section 35 is inputted into a PWM-control section 36. Furthermore, the motor 20 is PWM-driven through an inverter 37 serving as a driving section. The motor current value Im of the motor 20 is detected by a motor current detector 38 and is fed back to the subtracting section 32B. The inverter 37 uses field effect transistors (FETs) as driving elements and is comprised of a bridge circuit of FETs.

A compensation signal CM from a compensation signal generating section 34 is added to the adding section 32A, and a characteristic compensation of the steering system is performed by the addition of the compensation signal CM so as to improve a convergence, an inertia characteristic and so on. The compensation signal generating section 34 adds a self-aligning torque (SAT) 34-3 and an inertia 34-2 at an adding section 34-4, further adds the result of addition performed at the adding section 34-4 with a convergence 34-1 at an adding section 34-5, and then outputs the result of addition performed at the adding section 34-5 as the compensation signal CM.

In such an electric power steering apparatus, a component and a peripheral object of the apparatus constitute resonance systems. Since resonances of the resonance systems generate a vibration, a noisy sound and so on, suppression of them is desired, and various measures have been proposed.

For example, in the publication of Japanese Patent No. 5456576 B2 (Patent Document 1), a technique of eliminating a mechanical resonance frequency component of a rigid body part in a component of the electric power steering apparatus, such as a column and a rack, or a vehicle front structure, is proposed. The technique in Patent Document 1 eliminates the mechanical resonance frequency component by using a band cut filter (a band stop filter) or a notch filter having a steep damping characteristic, and further combining a low pass filter of second or more order with it.

THE LIST OF PRIOR ART DOCUMENTS

Patent Documents

Patent Document 1: Japanese Patent No. 5456576 B2
Patent Document 2: Japanese Patent No. 5235536 B2

SUMMARY OF THE INVENTION

Problems to be Solved by the Invention

However, control (torque control) performed from input of the steering torque and the vehicle speed to output of the current command value Irefm and control (current control) performed from input of the current command value Irefm to output of the motor current value Im, are performed periodically in the control unit 30 of the electric power steering apparatus, and when a relationship between a period (an operation period) Ts_trq of the torque control and a period (an operation period) Ts_cur of the current control is Ts_trq≥Ts_cur, an update period of the current command value in the current control is affected by an update period of the current command value in the torque control. For example, it is assumed that the current command values in the torque control and the current control are updated respectively as shown in FIGS. 3A and 3B. In FIGS. 3A and 3B, the horizontal axis shows time, the vertical axis shows the current command value, FIG. 3A shows a state of updating the current command value in the torque control, FIG. 3B shows a state of updating the current command value in the current control, and the operation period Ts_trq of the torque control is longer than the operation period Ts_cur of the current control. As known from FIGS. 3A and 3B, time points $t_1$, $t_2$ and $t_3$ are timing to input the current command value from the torque control in order to perform new calculation in the current control, however, these time points are within one operation period of the torque control, and the current command value is not updated in the torque control, so that the current command value in the current control is not updated either. The current command value is updated at a time point $t_4$ being timing to perform new calculation in the torque control, and the current command value in the current control is also updated at a time point $t_5$ being timing to perform new calculation in the current control after the time point $t_4$. Similarly, the current command value is updated at a time point $t_6$ being timing to perform next new calculation in the torque control, and the current command value in the current control is updated at a time point $t_7$ being timing to perform new calculation in the current control after the time point $t_6$. That is, the current command value in the current control is not updated in the operation period Ts_cur of the current control, but is updated in the time between the time point $t_5$ and the time point $t_7$, that is, the operation period Ts_trq of the torque control.

Thus, since the update period of the current command value in the current control is affected by the update period of the current command value in the torque control, notable spectra occur every half frequency of an operation frequency fs_trq (=1/Ts_trq) of the torque control in the case of performing fast Fourier transform (FFT) analysis in the operation period Ts_cur of the current control to the current command value in the torque control in voluntarily steering a steering wheel. FIG. 4 is a graph showing the above state, and indicates power spectra of the current command value in setting a frequency [Hz] to the horizontal axis and setting a power spectrum [dB] to the vertical axis. As shown by the broken line, steep power spectra occur in the vicinity of frequencies which are natural number times of fs_trq/2. This is because fs_trq/2 is equivalent to the Nyquist frequency of the update period (equal to the operation period) of the current command value in the torque control, and with respect to the current command value in the current control, the power spectra become large at the frequencies which are natural number times of fs_trq/2. When such a steep power spectrum occurs, regardless of presence or absence of a resonance frequency band (for example, from several Hz to several kHz of the mechanical resonance) of the electric power steering apparatus, the steep power spectrum becomes a vibration source, and causes the vibration, the noisy sound and so on.

Since the technique in Patent Document 1 uses a filter having a steep damping characteristic in a narrow frequency band to eliminate the mechanical resonance frequency component, it cannot accurately suppress the vibration, the noisy sound and so on, whose frequency bands are different, whose vibration source is the power spectrum occurring from the relationship between the operation period of the torque control and the operation period of the current control, and which occur regardless of presence or absence of the mechanical resonance as described above.

As an apparatus that eliminates a noise occurring depending on an operation, for example, an apparatus disclosed in the publication of Japanese Patent No. 5235536 B2 (Patent Document 2) uses a noise filter in order to eliminate a noise excited by a signal quantization error, a differential calculation or the like. The object of Patent Document 2 is to obtain a steering control apparatus where an operation amount is small and which is configured systematically and simply, and the apparatus in Patent Document 2 eliminates the noise by comprising a phase delay compensating section for setting a low frequency characteristic and a high range compensating section for setting a high frequency characteristic, and providing the noise filter in a post stage of them. However, it is unclear that the above power spectrum is a target of the elimination, and since the apparatus uses a low pass filter as the noise filter, the apparatus may become unstabilized by an influence of a phase delay in a control range.

The present invention has been developed in view of the above-described circumstances, and an object of the present invention is to provide an electric power steering apparatus that can accurately suppress the vibration, the noisy sound and so on whose vibration source is the power spectrum occurring from the relationship between the operation period of the torque control and the operation period of the current control, and which occur regardless of presence or absence of the mechanical resonance.

Means for Solving the Problems

The present invention relates to an electric power steering apparatus that comprises a torque control section which calculates a current command value based on at least a steering torque and a current control section which controls a motor current flowing to a motor based on the current command value, the above-described object of the present invention is achieved by that wherein an operation period of the torque control section is longer than or equal to an operation period of the current control section; and wherein the current control section comprises a specific frequency band eliminating section that attenuates at least one frequency component having a frequency obtained by multiplying about half of an operation frequency of the torque control section by a natural number in the current command value.

The above-described object of the present invention is more effectively achieved by that wherein the specific frequency band eliminating section comprises a notch filter; or wherein the specific frequency band eliminating section comprises a plurality of notch filters connected in series; or wherein the specific frequency band eliminating section comprises a low pass filter connected to the notch filter in series; or wherein the specific frequency band eliminating section inputs the current command value outputted from the torque control section.

Effects of the Invention

The electric power steering apparatus of the present invention enables accurate suppression of a vibration, a noisy sound and so on whose vibration source is a power spectrum occurring from a relationship between the operation period of the torque control and the operation period of the current control, and which occur regardless of presence or absence of a mechanical resonance, by using the filter that attenuates a frequency component having a frequency obtained by multiplying half of the operation frequency of the torque control by a natural number.

BRIEF DESCRIPTION OF THE DRAWINGS

In the accompanying drawings:

FIG. 3A is a diagram showing the state of updating the current command value in the torque control, FIG. 3B is a diagram showing the state of updating the current command value in the current control;

FIG. 10A is a characteristic diagram showing amplitude characteristics, FIG. 10B is a characteristic diagram showing phase characteristics;

MODE FOR CARRYING OUT THE INVENTION

The present invention attenuates a frequency component of a steep power spectrum occurring from a relationship between an operation period Ts_trq of torque control and an operation period Ts_cur of current control by using a filter having a steep damping characteristic in a narrow band, such as a notch filter. Specifically, in the case of Ts_trq≥Ts_cur, the present invention attenuates a frequency component at every half frequency of an operation frequency fs_trq (=1/Ts_trq) of the torque control. The operation period Ts_trq of the torque control and the operation period Ts_cur of the current control can be made different, for example, because of difference of an operation amount in each control. When the operation amount of the torque control is larger than the operation amount of the current control, the setting of Ts_trq≥Ts_cur can be performed, and in this case, the power spectrum described above occurs.

Such a steep power spectrum becomes a vibration source, and causes a vibration, a noisy sound and so on regardless of presence or absence of a mechanical resonance. Therefore, attenuating a frequency component in a range like a pinpoint by a notch filter or the like enables accurate suppression of the vibration, the noisy sound and so on with suppressing an influence on other frequency bands. Additionally, the notch filter is a filter of which a stopped frequency band is especially narrow among band stop filters.

Hereinafter, an embodiment of the present invention will be described with reference to the accompanying drawings.

Figure 1:
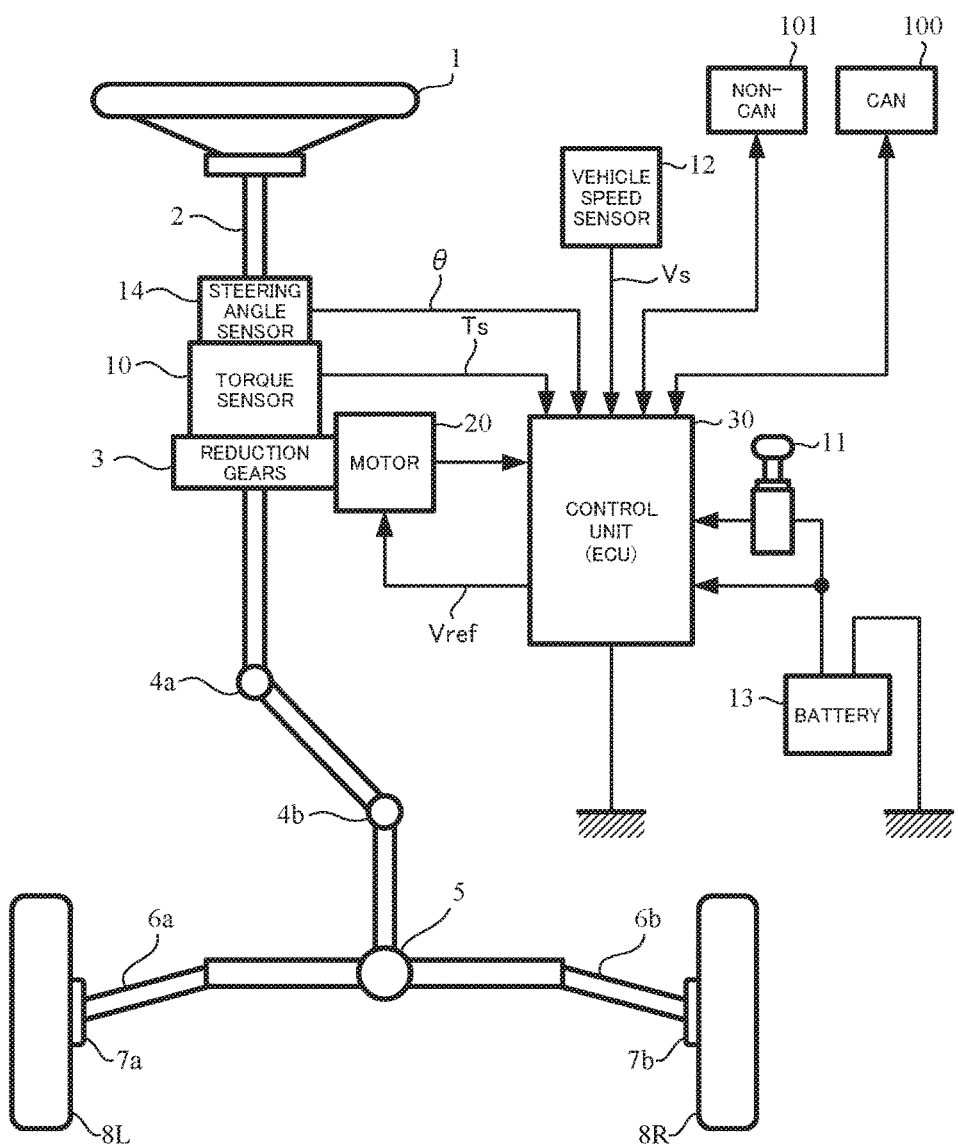
FIG. 1 is a configuration diagram illustrating a general outline of an electric power steering apparatus.
Figure 2:
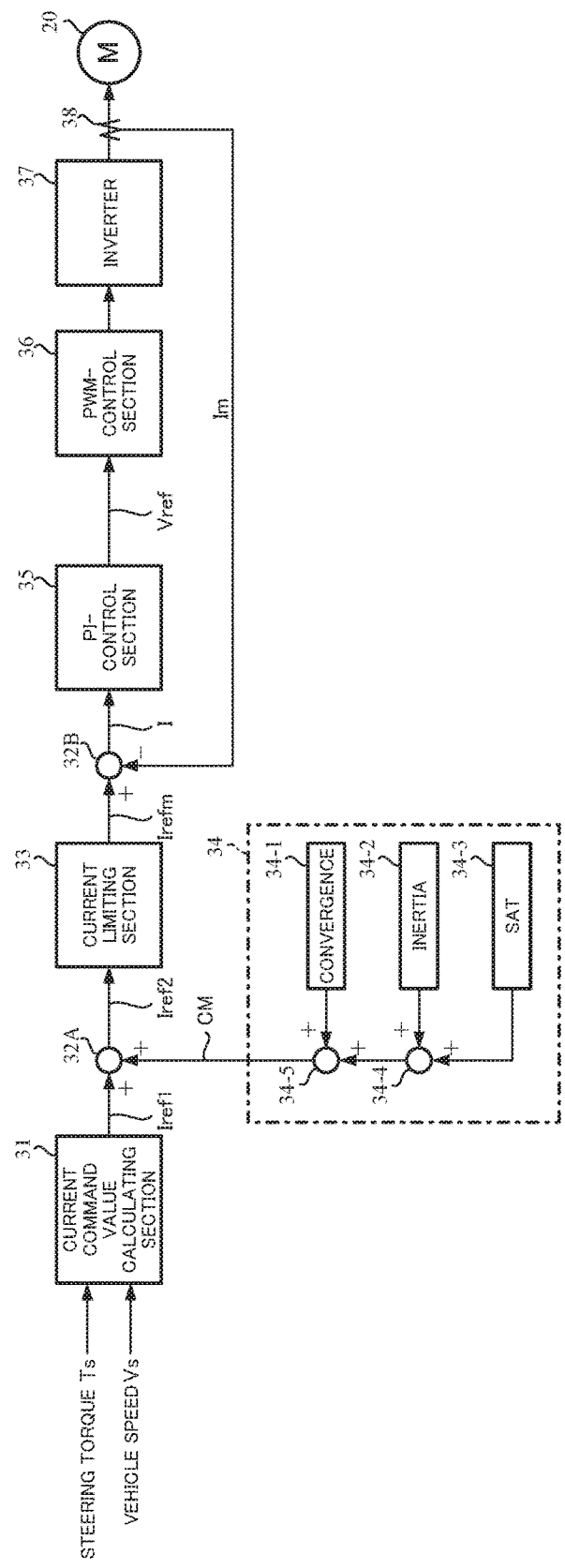
FIG. 2 is a block diagram showing a configuration example of a control unit (ECU) of the electric power steering apparatus.
Figure 5:
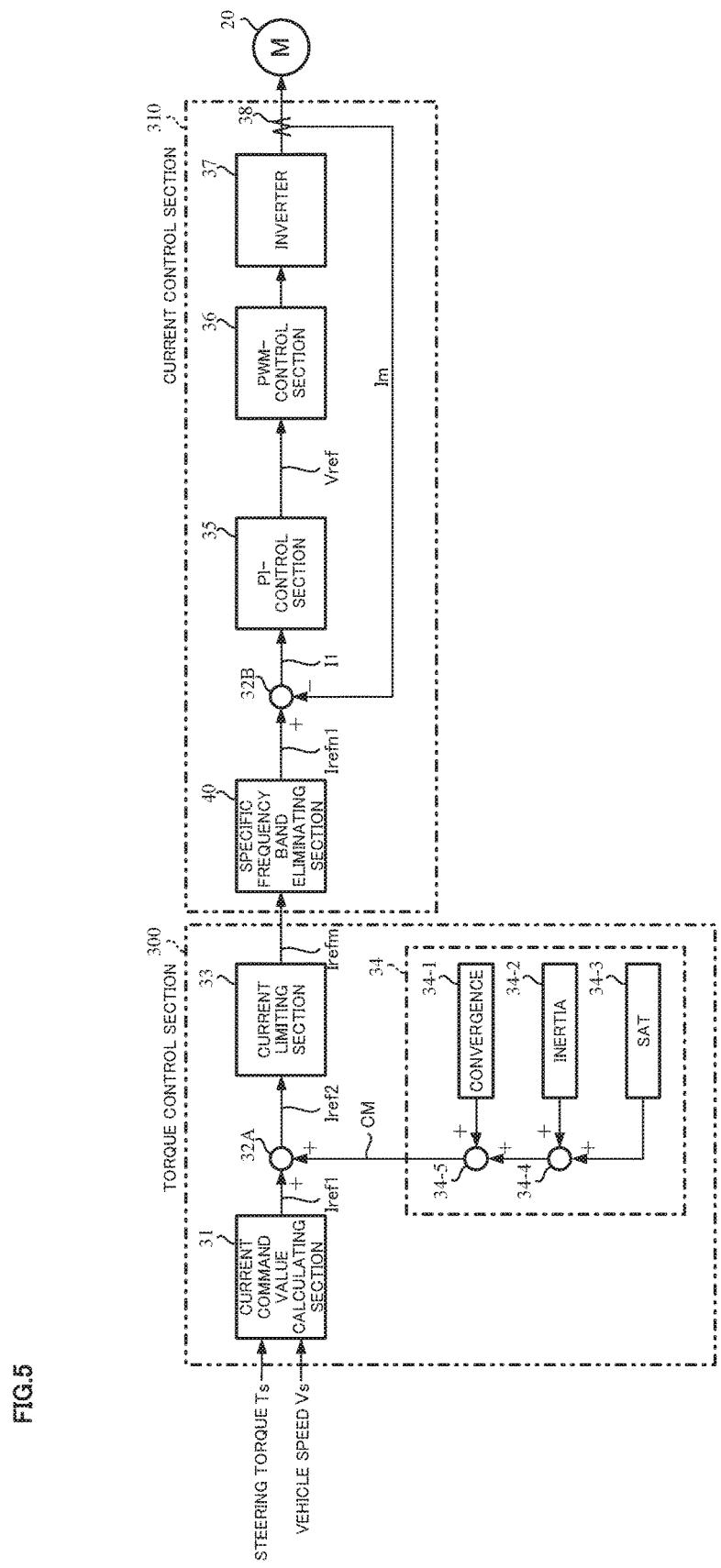
FIG. 5 is a block diagram showing a configuration example (a first embodiment) of the present invention.

FIG. 5 shows a configuration example (a first embodiment) of an embodiment of the present invention corresponding to FIG. 2, the same configurations are designated with the same numerals, and the explanation is omitted.

In the present configuration example, a specific frequency band eliminating section 40 is provided between a current limiting section 33 and a subtracting section 32B. A torque control section 300 comprises a current command value calculating section 31, an adding section 32A, the current limiting section 33 and a compensation signal generating section 34, and a current control section 310 comprises the specific frequency band eliminating section 40, the subtracting section 32B, a PI-control section 35, a PWM-control section 36, an inverter 37 and a motor current detector 38. The torque control section 300 performs torque control in the operation period Ts_trq, the current control section 310 performs current control in the operation period Ts_cur, and Ts_trq≥Ts_cur is set. Moreover, installation of the compensation signal generating section 34 is optional, and an addition, a change or the like of a compensation content is possible.

Figure 6:
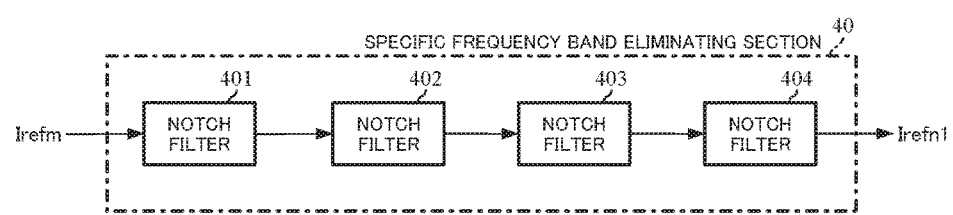
FIG. 6 is a block diagram showing a configuration example of a specific frequency band eliminating section in the first embodiment.

The specific frequency band eliminating section 40, for example, is configured by connecting four notch filters in series as shown in FIG. 6. In order to attenuate a frequency component of a current command value corresponding to a power spectrum occurring every half frequency of the operation frequency fs_trq (=1/Ts_trq) of the torque control section 300, damping frequencies of notch filters 401, 402, 403 and 404 are set at fs_trq/2, fs_trq, fs_trq×3/2 and fs_trq×2 respectively. Here, the damping frequency indicates a frequency where an amplitude is the smallest in an amplitude characteristic of a filter, and can be called a notch frequency, a center frequency or the like.

Each notch filter is designed as a secondary filter, and the frequency characteristic is shown by a transfer function G of the following expression 1 in the case of defining the damping frequency as "fe".

$$G = \frac{\omega_d^2}{\omega_n^2} \frac{s^2 + 2\zeta_n \omega_n s + \omega_n^2}{s^2 + 2\zeta_d \omega_d s + \omega_d^2} \qquad \text{[Expression 1]}$$

Figure 7:
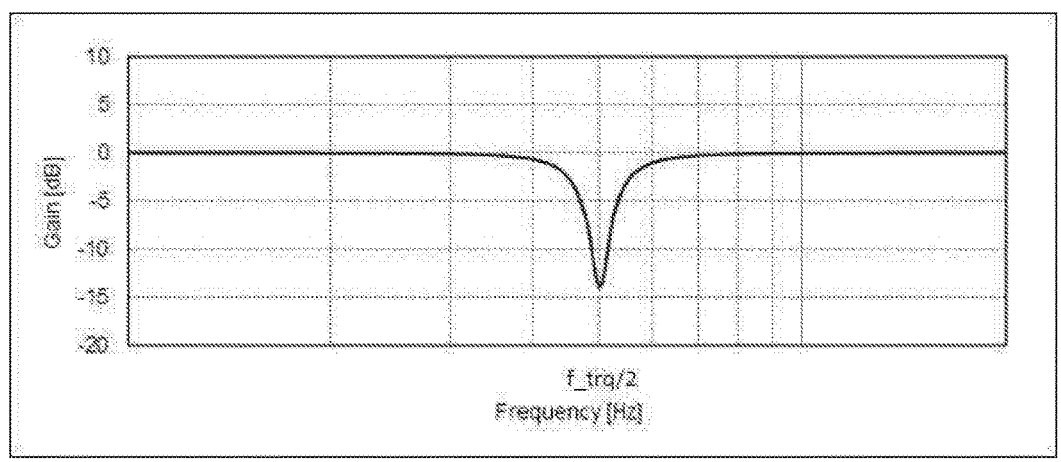
FIG. 7 is a characteristic diagram showing an example of a frequency characteristic (an amplitude characteristic) of a notch filter.

Here, $\omega_n = \omega_d = 2\pi \times fe$, "s" is a Laplace operator, $\zeta_n$ and $\zeta_d$ are damping coefficients, and $\zeta_n < \zeta_d$. In this case, the amplitude characteristic becomes, for example, a characteristic shown in FIG. 7. In FIG. 7, the horizontal axis shows a frequency [Hz], the vertical axis shows an amplitude (a gain) [dB], and FIG. 7 shows the amplitude characteristic in the case of setting $\omega_n = \omega_d = 2\pi \times (fs\_trq/2)$, $\zeta_n = 0.02$ and $\zeta_d = 0.1$. As known from FIG. 7, the amplitude becomes the smallest at the damping frequency fe=fs_trq/2. Though the transfer function G is defined as an expression of a continuous system in the expression 1, it is used by being transformed into a secondary filter of a discrete system in implementation.

Parameters of the expression 1 that are calculated and set in advance by setting fe=fs_trq/2, are held in the notch filter 401, and the notch filter 401 transforms an inputted current command value (a current command value signal) on the basis of the expression 1. Similarly, parameters of the expression 1 that are calculated and set in advance by setting fe=fs_trq, fe=fs_trq×3/2 and fs_trq×2, are held in the notch filters 402, 403 and 404 respectively, and the notch filters 402, 403 and 404 transform current command values inputted into respective notch filters on the basis of the expression 1.

Moreover, the notch filters 401, 402, 403 and 404 may be connected in an order other than the order shown in FIG. 6.

Figure 3A:
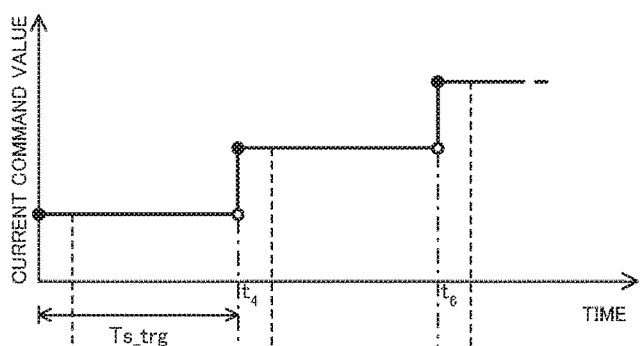
FIGS. 3A and 3B are diagrams showing states of updating current command values in torque control and current control.
Figure 3B:
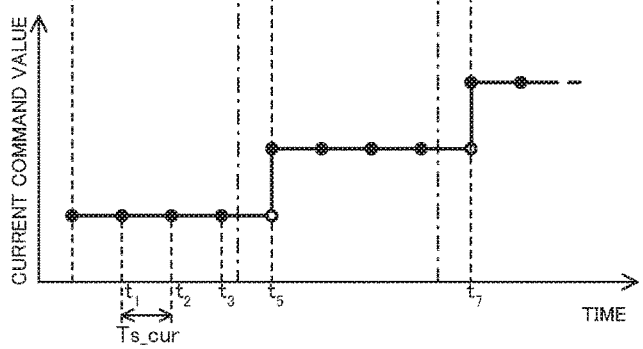

A sample-and-hold section, which is not shown in FIG. 5, exists between the current limiting section 33 of the torque control section 300 and the specific frequency band eliminating section 40 of the current control section 310. Since the operation period Ts_trq of the torque control section 300 and the operation period Ts_cur of the current control section 310 are different, the current control section 310 cannot receive the data (the current command value) outputted from the torque control section 300 in synchronization with the torque control section 300. Therefore, the sample-and-hold section stores (samples) the data outputted from the torque control section 300, and holds it until the current control section 310 can receive it. For example, in the case of updating the current command value as shown in the above FIG. 3, even if the current command value updated at the time point $t_4$ is outputted from the torque control section 300, the current control section 310 can receive its current command value at the time point $t_5$, so that the sample-and-hold section holds its current command value until the time point $t_5$ when the current control section 310 can receive it. Similarly, the sample-and-hold section holds the current command value updated at the time point $t_6$ until the time point $t_7$ when the current control section 310 can receive it. This enables avoidance of missing of the data. The sample-and-hold section may be included in the specific frequency band eliminating section 40.

Figure 8:
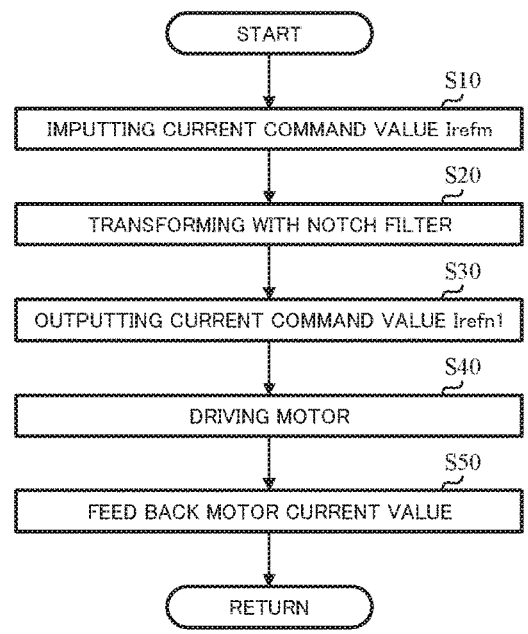
FIG. 8 is a flowchart showing an operating example (the first embodiment) of the present invention.

In such a configuration, an operating example of the current control section 310 will be described with reference to a flowchart shown in FIG. 8.

A current command value Irefm outputted from the current limiting section 33 of the torque control section 300, is inputted into the specific frequency band eliminating section 40 (Step S10).

In the specific frequency band eliminating section 40, the notch filter 401 inputs the current command value Irefm, and transforms the current command value Irefm on the basis of the expression 1 by using the held parameter. The transformed current command value Irefm is inputted into the notch filters 402, 403 and 404 sequentially, and each notch filter transforms the current command value on the basis of the expression 1 by using the held parameter (Step S20). The current command value transformed by the notch filter 404 is outputted to the subtracting section 32B as a current command value Irefn1 (Step S30).

After that, through the same operations as described above, a motor 20 is PWM-driven (Step S40), and a motor current value Im detected by the motor current detector 38 is fed back to the subtracting section 32B (Step S50).

The above operations are repeated in the operation period Ts_cur.

Figure 4:
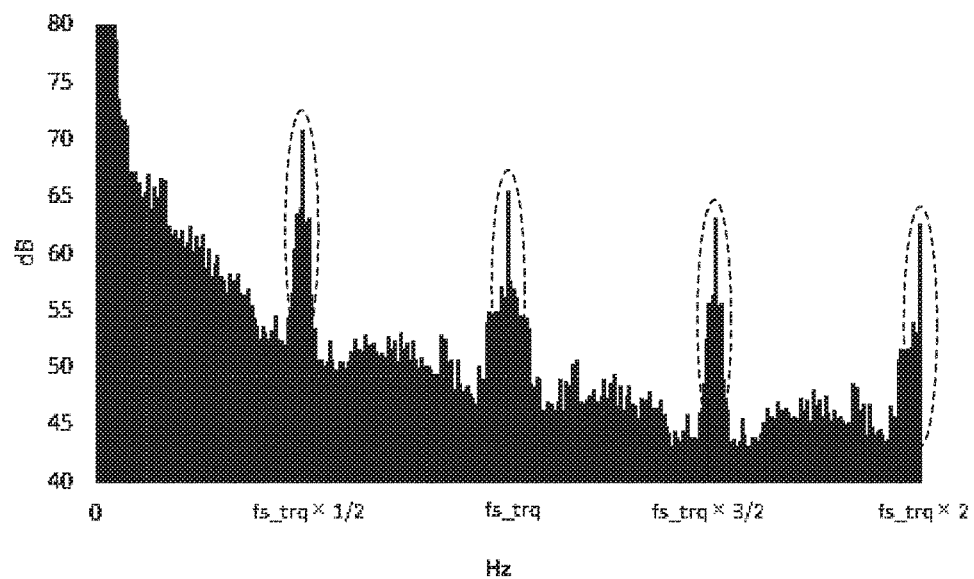
FIG. 4 is a graph showing an example of a power spectrum of the current command value.
Figure 9:
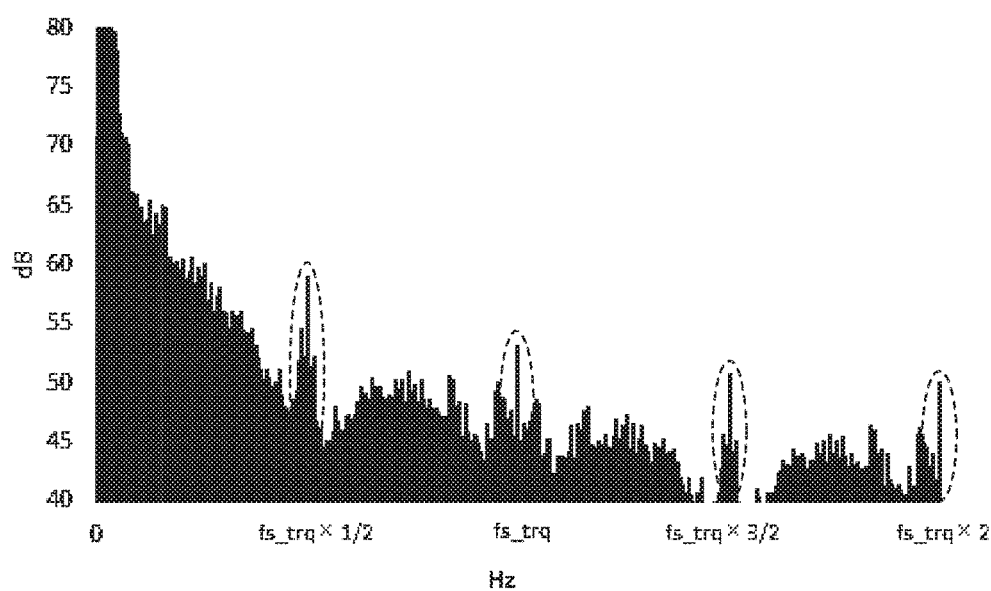
FIG. 9 is a graph showing an example of a power spectrum of a current command value in the first embodiment.

A result of applying the present embodiment to the current command value having the power spectrum shown in FIG. 4, is shown in FIG. 9. As with FIG. 4, FIG. 9 indicates the power spectra of the current command value in setting a frequency [Hz] to the horizontal axis and setting a power spectrum [dB] to the vertical axis. Comparing the power spectra shown in FIG. 4 and the power spectra shown in FIG. 9, it is found out that the steep power spectrum (circled by the broken line) occurring every half frequency of the operation frequency fs_trq is reduced.

Moreover, the effect obtained by using the notch filter will be described by comparison with a low pass filter (LPF).

Figure 10A:
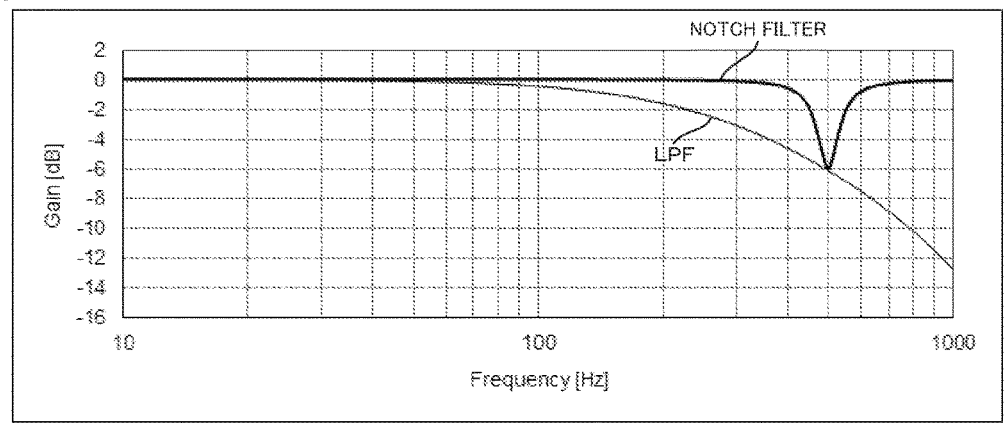
FIGS. 10A and 10B are characteristic diagrams showing an example of frequency characteristics of a notch filter and a low pass filter (LPF) that are used in a simulation of comparing the notch filter and the LPF.
Figure 10B:
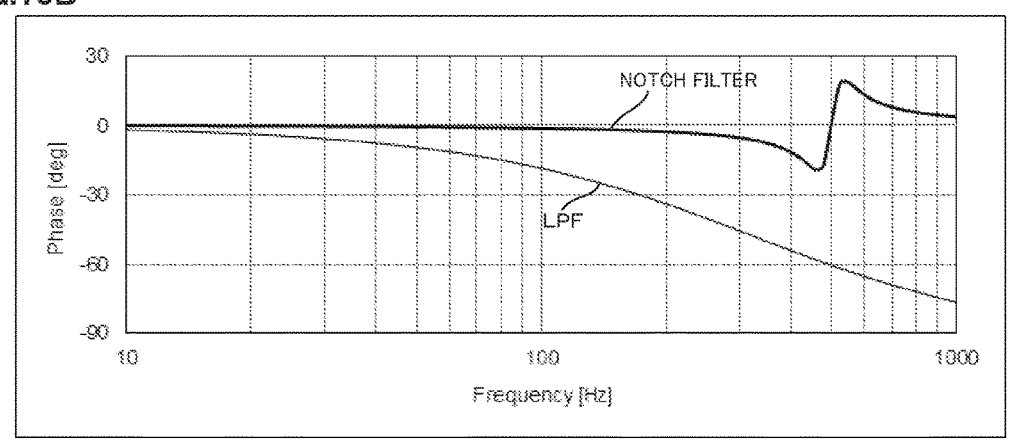
Figure 11:
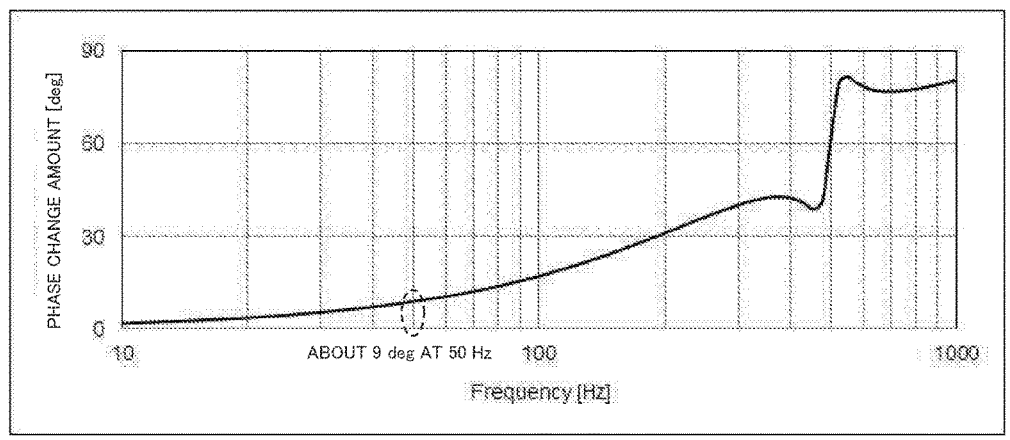
FIG. 11 is a diagram showing a difference (a phase change amount) between the phase characteristics shown in FIG. 10B.

As the notch filter, a notch filter where the damping coefficients $\zeta_n$ and $\zeta_d$ are set at 0.05 and 0.1 respectively, the operation period Ts_trq of the torque control is set at 1 ms (in this case, the operation frequency fs_trq is 1 kHz), and the damping frequency fe is set at fs_trq/2=500 [Hz], is used. As the LPF, an LPF whose cutoff frequency is 300 Hz so that the amplitude at 500 Hz coincides with the amplitude of the notch filter, is used. Amplitude characteristics of the notch filter and the LPF are shown in FIG. 10A, and phase characteristics of them are shown in FIG. 10B. In FIGS. 10A and 10B, the horizontal axis shows a frequency [Hz], the vertical axis in FIG. 10A shows an amplitude (a gain) [dB], the vertical axis in FIG. 10B shows a phase [deg], the thick line shows the frequency characteristic of the notch filter, and the thin line shows the frequency characteristic of the LPF. Further, a difference (a phase change amount) between the phase characteristic of the notch filter and the phase characteristic of the LPF is shown in FIG. 11. In FIG. 11, the horizontal axis shows a frequency [Hz], and the vertical axis shows a phase change amount [deg] (="the phase of the notch filter"−"the phase of the LPF").

Figure 12:
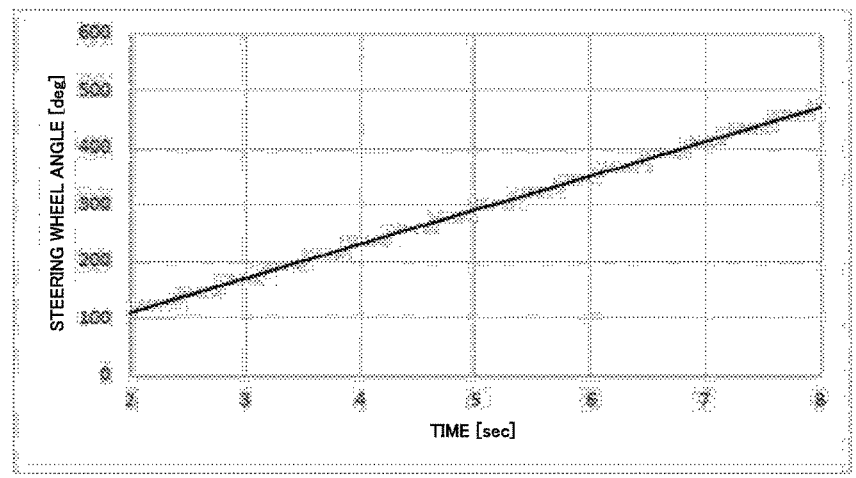
FIG. 12 is a diagram showing an example of a steering wheel angle inputted to the simulation of comparing the notch filter and the LPF.
Figure 13A:
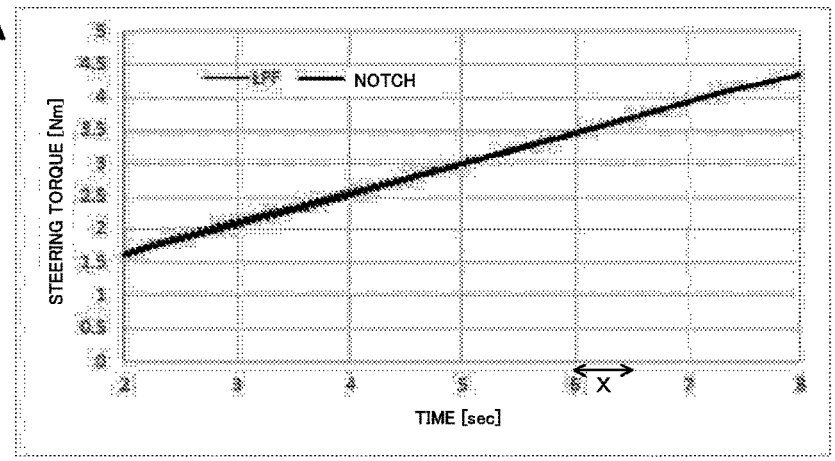
FIGS. 13A and 13B are graphs showing a change of a steering torque being a result of the simulation of comparing the notch filter and the LPF.
Figure 13B:
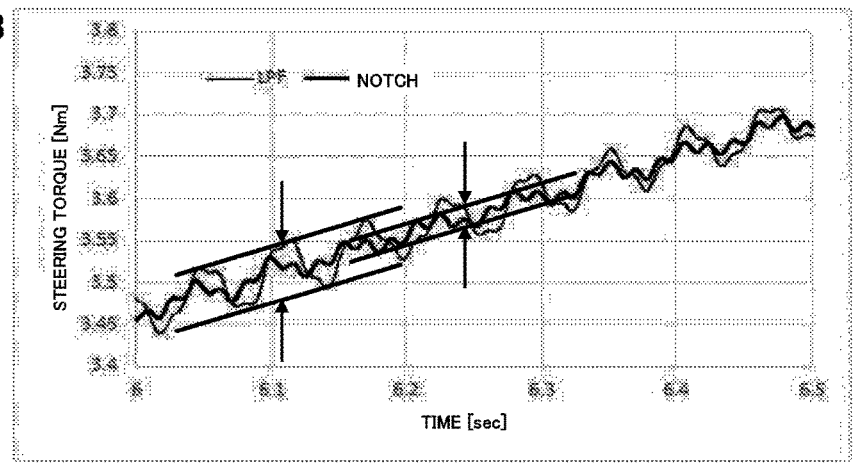

Using the above notch filter and the above LPF, a simulation result of a time response of a steering torque (a torsion bar torque) is shown in FIGS. 13A and 13B in the case of changing a steering wheel angle (an angle on an upper side of a torsion bar) as shown in FIG. 12. In FIGS. 13A and 13B, the horizontal axis shows time [sec], the vertical axis shows the steering torque [newton meter (Nm)], the thick line shows the time response in the case of using the notch filter, and the thin line shows the time response in the case of using the LPF. FIG. 13B shows the time response by enlarging the time range (6 to 6.5 sec) shown by "X" in FIG. 13A.

As known from FIGS. 13A and 13B, a vibration of the steering torque is reduced in the case of using the notch filter more than in the case of using the LPF. This is because a phase delay is recovered in the case of using the notch filter more than in the case of using the LPF as shown in FIG. 11 (for example, it is recovered about 9 deg at 50 Hz), and the vibration is reduced by its influence. Thus, using the notch filter enables improvement of stability of a system and improvement of a vibration occurring by an influence of a feedback loop.

Moreover, though the first embodiment comprises four notch filters, it is possible to change the number of the notch filters according to the number of the power spectra desired to attenuate. For example, when the power spectrum at the frequency of fs_trq/2 is notably so large that only the frequency component of this power spectrum is desired to attenuate, the specific frequency band eliminating section 40 can comprise only the notch filter 401. When the frequency component of the power spectrum at the frequency of fs_trq×5/2 is also desired to attenuate, the notch filter whose damping frequency is this frequency can be added to the specific frequency band eliminating section 40.

Further, since there is a possibility that a little deviation of the damping frequency of the notch filter occurs by a rounding error of a parameter occurring in transforming the transfer function of the notch filter into a transfer function of a discrete system, an error occurring in accordance with a transfer method (bilinear transform, a prewarp method, a backward difference method, etc.) or the like, the damping frequency of the notch filter may be set at a value obtained by adding some tolerance (for example, within ±5%) to a desired frequency (n/2 times of fs_trq ("n" is a natural number)).

Furthermore, though the specific frequency band eliminating section 40 comprises the notch filter, it may comprise a band stop filter other than the notch filter. Alternatively, the specific frequency band eliminating section 40 may comprises the notch filter and the other band stop filter mixedly. For example, since the stopband of the notch filter is narrower than ones of other band stop filters, a configuration where the notch filter is used for a range where a frequency component of a narrow band is desired to attenuate and a band stop filter other than the notch filter is used for a range where a frequency component of a band having some tolerance is desired to attenuate, etc., can be adopted.

Next, a second embodiment of the present invention will be described.

Figure 14:
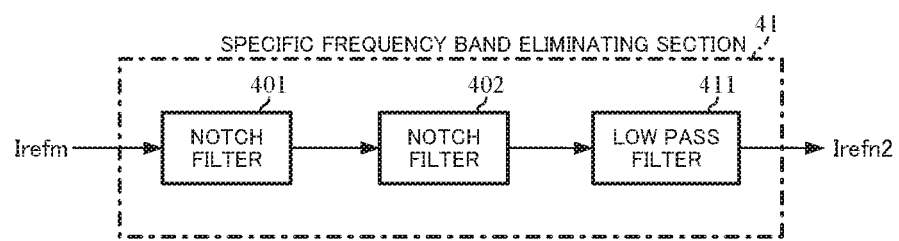
FIG. 14 is a block diagram showing a configuration example of a specific frequency band eliminating section in a configuration example (a second embodiment) of the present invention.

In the second embodiment, a specific frequency band eliminating section comprises a notch filter and a low pass filter. FIG. 14 shows a configuration example of a specific frequency band eliminating section 41 in the present embodiment. Compared with the specific frequency band eliminating section 40 in the first embodiment shown in FIG. 6, a low pass filter 411 is provided instead of the notch filters 403 and 404. Other configurations are the same as the first embodiment.

As with the first embodiment, the notch filters 401 and 402, whose damping frequencies are fs_trq/2 and fs_trq respectively, are designed so as to attenuate the frequency components of these frequencies respectively, so that the low pass filter 411 is designed so as to reduce a frequency component of a frequency more than or equal to fs_trq×3/2.

For example, in the case of designing the low pass filter 411 as a primary filter, the frequency characteristic is shown by a transfer function $G_1$ of the following expression 2.

$$G_1 = \frac{1}{\frac{s}{\omega_c} + 1} \qquad \text{[Expression 2]}$$

Here, $\omega_c = 2\pi \times fc$, fc is a cutoff frequency, and the low pass filter 411 is designed so as to set fc≤fs_trq×3/2.

In the case of designing the low pass filter 411 as a secondary filter, a transfer function $G_2$ is defined by the following expression 3.

$$G_2 = \frac{1}{\left(\frac{s}{\omega_c}\right)^2 + \frac{2\zeta s}{\omega_c} + 1} \qquad \text{[Expression 3]}$$

Here, $\zeta$ is a damping coefficient, $\omega_c = 2\pi \times fc$, and the low pass filter 411 is designed so as to set fc fs_trq×3/2.

A preset parameter of the expression 2 or the expression 3 is held in the low pass filter 411, and the low pass filter 411 transforms the inputted current command value on the basis of the expression 2 or the expression 3.

Moreover, the notch filters 401 and 402, and the low pass filter 411 may be connected in an order other than the order shown in FIG. 14.

An operation of the second embodiment is the same as the operation of the first embodiment. The current command value Irefm inputted into the specific frequency band eliminating section 41 is sequentially transformed by the notch filters 401 and 402, and the low pass filter 411, and the transformed current command value is outputted to the subtracting section 32B as a current command value Irefn2.

Thus, the low pass filter reduces the frequency components of power spectra in frequencies more than or equal to a fixed frequency (fs_trq×3/2 in the second embodiment) among the steep power spectra occurring every half frequency of the operation frequency fs_trq, so that it is possible to reduce the frequency components of the above power spectra with a smaller operation amount than in the case of using the notch filter.

Moreover, though the second embodiment comprises two notch filters, it may comprises one notch filter, or three or more notch filters. In this case, the cutoff frequency of the low pass filter is set so that the low pass filter reduces frequency components other than the frequency component reduced by the notch filter. Further, the order of the transfer function of the low pass filter may be more than or equal to three. Furthermore, a band stop filter other than the notch filter may be used instead of the notch filter.

Next, a third embodiment of the present invention will be described.

Figure 15:
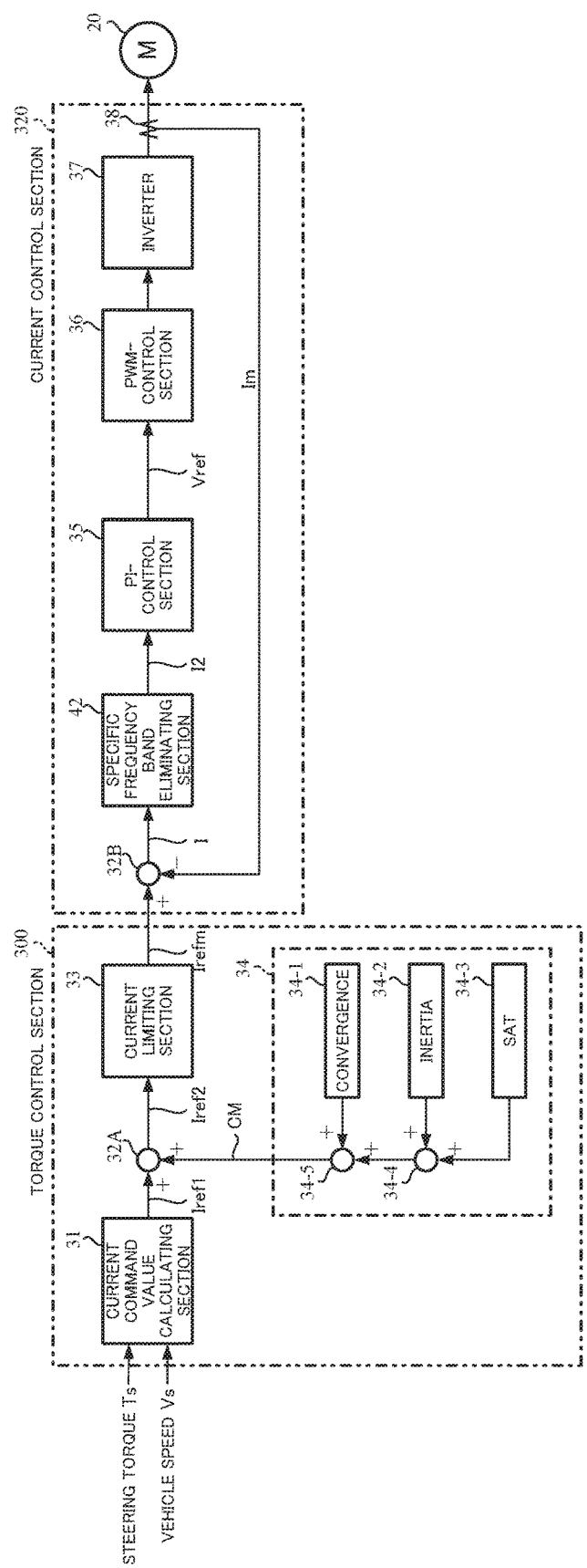
FIG. 15 is a block diagram showing a configuration example (a third embodiment) of the present invention.

FIG. 15 shows a configuration example of the present embodiment corresponding to FIG. 2 and FIG. 5, the same configurations are designated with the same numerals, and the explanation is omitted.

Though the specific frequency band eliminating section 40 is provided between the current limiting section 33 and the subtracting section 32B in the first embodiment, a specific frequency band eliminating section 42 is provided between the subtracting section 32B and the PI-control section 35 in the third embodiment. Therefore, not the current command value Irefm but a deviation I between the current command value Irefm and the motor current value Im, is inputted into the specific frequency band eliminating section 42.

The specific frequency band eliminating section 42 exhibits the same effect as the first embodiment or the second embodiment by being configured in the same configuration as the specific frequency band eliminating section 40 of the first embodiment or the specific frequency band eliminating section 41 of the second embodiment, and performing the same operation as it.

Though the above embodiments (the first embodiment to the third embodiment) comprise one specific frequency band eliminating section, two specific frequency band eliminating sections may be provided at the position of the first embodiment and the second embodiment (between the current limiting section 33 and the subtracting section 32B) and at the position of the third embodiment (between the subtracting section 32B and the PI-control section 35) respectively. In this case, the notch filters and the low pass filter constituting the specific frequency band eliminating section are divided, and are allocated to respective specific frequency band eliminating sections provided at the two positions.

Further, in the above embodiments, it is possible to use a direct current motor, a three-phase brushless motor or the like as the motor, and to use not the PI control but a general model matching in the PI-control section.

EXPLANATION OF REFERENCE NUMERALS 1 steering wheel
2 column shaft (steering shaft, handle shaft)
10 torque sensor
12 vehicle speed sensor
20 motor
30 control unit (ECU)
31 current command value calculating section
33 current limiting section
34 compensation signal generating section
35 PI-control section
36 PWM-control section
37 inverter
38 motor current detector
40, 41, 42 specific frequency band eliminating section
300 torque control section
310, 320 current control section
401, 402, 403, 404 notch filter
411 low pass filter

The invention claimed is:

1. An electric power steering apparatus that comprises a torque control section which calculates a current command value based on at least a steering torque and a current control section which controls a motor current flowing to a motor based on said current command value,
wherein a specific frequency band eliminating section is arranged in said current control section; and
wherein said specific frequency band eliminating section comprises at least a notch filter, and attenuates at least one frequency component having a frequency obtained by multiplying about half of an operation frequency of said torque control section by a natural number in a power spectrum of said current command value, said power spectrum occurring when an operation period of said torque control section is longer than or equal to an operation period of said current control section and an operation amount of said torque control section is larger than an operation amount of said current control section.

2. The electric power steering apparatus according to claim 1,
wherein said specific frequency band eliminating section is arranged between said torque control section and a subtracting section of said current control section.

3. The electric power steering apparatus according to claim 2,
wherein said specific frequency band eliminating section comprises a plurality of said notch filters connected in series.

4. The electric power steering apparatus according to claim 2,
wherein said specific frequency band eliminating section comprises a low pass filter connected to said notch filter in series.

5. The electric power steering apparatus according to claim 2,
wherein said specific frequency band eliminating section is arranged between said subtracting section of said current control section and a proportional-integral (PI) control section.

6. The electric power steering apparatus according to claim 1,
wherein said specific frequency band eliminating section comprises a plurality of said notch filters connected in series.

7. The electric power steering apparatus according to claim 6,
wherein said specific frequency band eliminating section comprises a low pass filter connected to said notch filter in series.

8. The electric power steering apparatus according to claim 6,
wherein said specific frequency band eliminating section is arranged between a subtracting section of said current control section and a proportional-integral (PI) control section.

9. The electric power steering apparatus according to claim 1,
wherein said specific frequency band eliminating section comprises a low pass filter connected to said notch filter in series.

10. The electric power steering apparatus according to claim 9,
wherein said specific frequency band eliminating section is arranged between a subtracting section of said current control section and a proportional-integral (PI) control section.

11. The electric power steering apparatus according to claim 1,
wherein said specific frequency band eliminating section is arranged between a subtracting section of said current control section and a proportional-integral (PI) control section.

* * * * *